Aug. 16, 1938.  W. W. NASH  2,127,003
ANTISTALL CLUTCH FOR ROTARY TOOLS
Filed Dec. 31, 1936
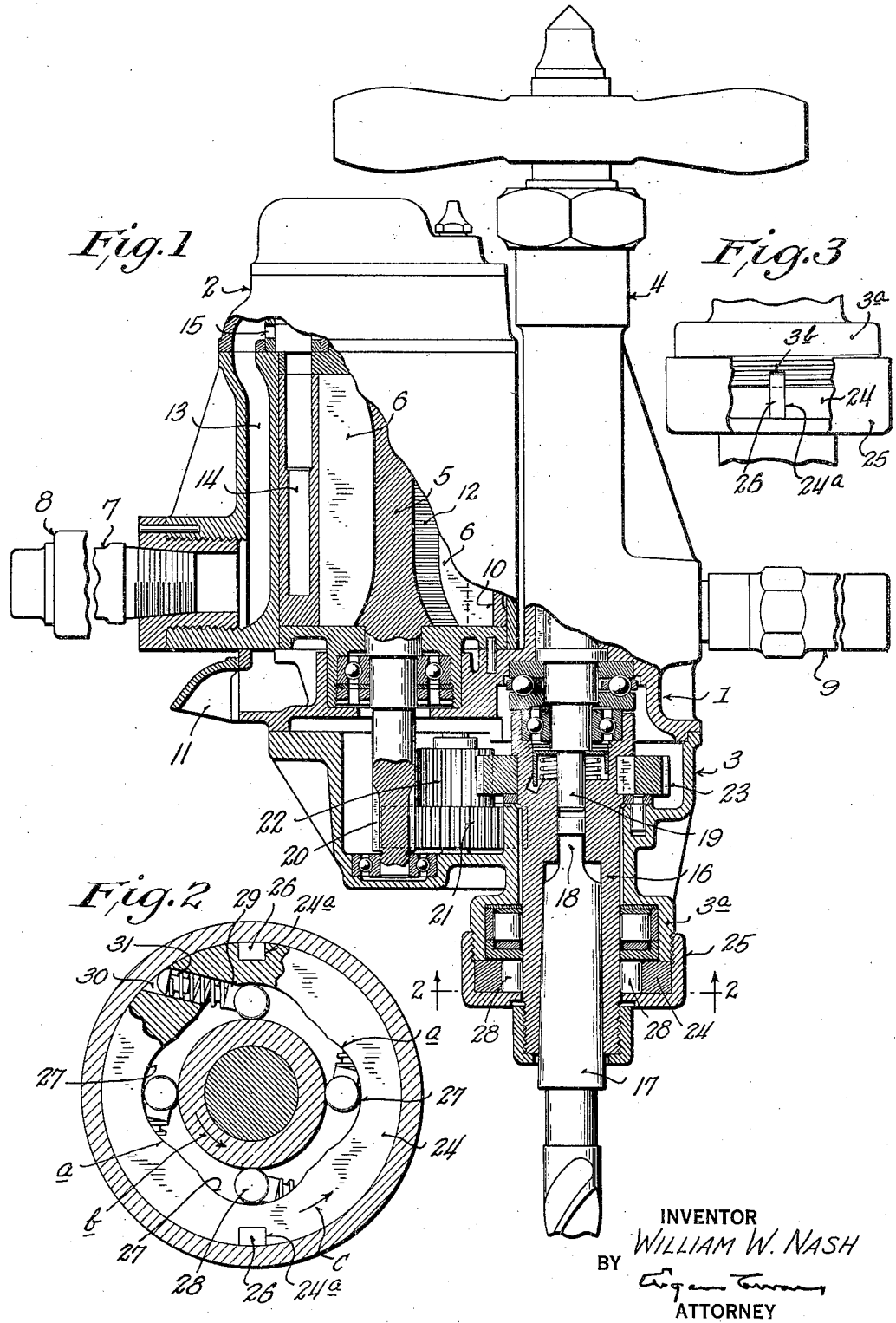
INVENTOR
WILLIAM W. NASH
BY
ATTORNEY Patented Aug. 16, 1938

2,127,003

UNITED STATES PATENT OFFICE 2,127,003

ANTISTALL CLUTCH FOR ROTARY TOOLS

William W. Nash, Aurora, Ill., assignor to Independent Pneumatic Tool Co., Chicago, Ill., a corporation of Delaware Application December 31, 1936, Serial No. 118,562

4 Claims. (Cl. 77—6)

This invention relates to power operated portable tools for drilling, reaming, nut setting, and other rotary operations.

In tools of the fluid actuated rotary type, the motor comprises a rotor with blades for rotating the spindle of the tool. When an operator uses a tool of this character for drilling or reaming a hole and the job is exceptionally heavy, the tool occasionally stalls. At that time there is a chip or a cutting left either from the drill bit or reamer in the hole of the material being drilled, which chip or cutting is rather difficult to remove. Each time the operator inserts the tool into the hole he strikes this material, and the machine again stalls. Sometimes the force will even break the drill bit.

What is customarily done under these conditions is to leave the drill in a stalled position and with the air pressure back of the blades of the rotor, use the complete machine as a lever and try to remove the surplus material or chip so that the machine can again start on its way.

In the reciprocating type of tool sufficient leverage is available to overcome a stalled bit due to the arrangement of the pistons and the connecting rods.

In the rotary type of machine there is sufficient torque at working speed, but, when the machine is stalled the torque rapidly disappears causing a loss of the air between the blades, rotor, etc., due to the construction of this kind of tool which is efficient only at its working speed. This has been a decided disadvantage to these tools should the drill stop before completing the hole.

The general purpose and object of my invention is to overcome this objection, and I do so by providing a one-way clutch device in the tool construction, which clutch device will enable the operator to leverage a stalled spindle into action by merely turning the tool in the direction the spindle should revolve. The clutch device is entirely safe to the operator in that the clutch automatically releases as soon as the motor turns the spindle, the motor being under power while leveraging a stalled spindle. As soon as the torque increases until the machine or spindle stalls, the operator, who is grasping the throttle handle in one hand and holding the supporting handle in the other hand, immediately applies pressure to turn the tool in the same direction as the spindle should revolve, and, then with the increased leverage, plus the dead or torque load of the motor, he is able to start the spindle again revolving.

With this clutch device installed in the tool, it is possible to use a smaller size machine as the operator can help or assist the torque of the motor at will.

In nut tightening operations, the machine can be of a smaller capacity, and as the nut is driven to tightness and the motor stalls a slight turning of the tool in the forward direction by the operator will tighten the nut securely and give the operator a chance to feel the exact tightness of each nut which is driven.

In the one-way clutch device employed, there is only one movement required to leverage the spindle, and that in the same direction in which the motor rotates the spindle. The clutch device is continuously out of clutch, except when the spindle stops and the tool is turned bodily to leverage the spindle into action as herein referred to.

The invention consists further in the features hereinafter described and claimed, and in the accompanying drawing illustrating a preferred embodiment of my invention—

Fig. 1 shows a portable rotary tool (partly in section partly in elevation) with a one-way clutch device in accordance with my invention;

Fig. 2 is a transverse sectional view taken through the clutch device on line 2—2 of Fig. 1; and Fig. 3 shows a detail of construction to be later described.

In the drawing, 1 indicates the frame of the tool and 2, 3 indicates, respectively, the motor and the gear case sections secured to the opposite sides of the frame as shown. The feed screw is indicated at 4.

The motor comprises a rotor 5 having a number of radial blades 6 against which acts the pressure fluid admitted to the tool through the live handle 7, this handle is at one side of the tool and extends laterally therefrom as shown in Fig. 1. The handle 7 is equipped with a throttle valve (not shown), the control sleeve of which is marked 8. The other handle is on the opposite side of the tool and is shown at 9.

The pressure fluid for the motor enters its cylinder 10 on its high pressure side and is exhausted from its lower pressure side through an exhaust outlet 11 in the tool frame 1. The motor 5 has slots 12 for the blades 6, and the motor housing has connected passages 13, 14 for conveying the compressed air from the handle 7 to the rotor cylinder 10. The connecting port 15 for said passages is controlled by a governor actuated valve forming a part of the governor assembly at the top of the motor.

The tool spindle 16 is journaled in the gear casing 3 and is made hollow to receive the tapered end of a drill bit or reamer 17 as shown. The bit may have a tang 18 to help carry the torque, and to prevent slipping at the taper. The tool in its feed screw assembly may have an ejecting stem 19 for removing the bit from the spindle when desired.

The shaft 20 of the rotor extends into the gear casing 3 at one side of the spindle 16 and has a driving connection with the spindle by a reducing gear as shown. The drive comprises teeth on the shaft 20 and gear members 21, 22 and 23, the latter being keyed on the spindle.

The one-way clutch device in accordance with my invention is incorporated in the tool construction, preferably adjacent the outer end portion of the spindle 16 as depicted in Fig. 1. This clutch device as indicated in Fig. 2, comprises an annular or ring member 24 supported about the spindle by a cup-shaped element 25 screwed on the threaded outer end of the gear case section 3. The member 24 is non-rotative, being preferably secured to the gear casing by one or more keys 26, 26. In the embodiment shown, the keys fit in slots in the member 24, and in the lower edge of the adjacent gear case extension 3a, respectively, as illustrated in Figs. 2 and 3. The slots in the member 24 are in the periphery of said member and are marked 24a. The slots in the extension 3a are marked 3b. The cap member 25 holds the keys in the respective slots, the keys being long enough to extend above the member 24 and into the slots 3b.

The inner periphery of the member 24 is spaced from the spindle 16 and is provided with a number of semi-circular recesses 27, 27 to accommodate clutch rollers 28, 28, one in each recess. These rollers are retained in the recesses by spring biased plungers 29, 29 which co-operate with bores 30 provided therefor in the ring element 24. The coiled springs 31 for the plungers fit in these bores as shown in Fig. 2.

When the rollers 28 are in the deepest portions of the recesses 27, as shown in Fig. 2, the one-way clutch device is inactive and the spindle is free to be driven by the motor without hindrance by the clutch device. This is the normal condition of the clutch and is due to the fact that the spaces occupied by the rollers are slightly greater than their individual diameters. When the entire tool is turned to leverage a stalled spindle into action, the ring member 24 is turned with the tool casing relatively to the spindle and the cam-like ends a of the recesses 27 wedge the rollers against the spindle to impart the turning force exerted on the tool casing by the operator to the spindle. The leverage exerted on the spindle is of course aided by the dead load of the motor and the force of the pressure fluid on its blades. The air pressure supply to the motor is on while leveraging a stalled spindle. Thus, as soon as the resistance stalling the spindle is overcome, the motor immediately takes up the rotation of the spindle, and the clutch automatically releases as the spindle then over-runs the turning effort exerted by the operator. At this time the clutch elements 28 are in the deepest portions of the recesses 27 and the clutch device is inactive or out-of clutch.

In the tool shown, the rotation of the spindle by the motor is clock-wise, the direction being indicated by the arrow b in Fig. 2. The clutch device also acts in this direction, the arrow c indicating the direction in which the ring 24 is turned by the operator to leverage a stalled spindle. Turning the tool proper in the same direction as the spindle is rotated by the motor, has the important advantage of having the motor pick up the spindle as soon as the resistance for which the leverage is applied is overcome.

Another advantage of the invention is that the tool carries the one-way clutch as a part of its construction, and thus provides the tool assembly with means whereby a stalled spindle may be leveraged by the mere act of the operator turning the tool in the direction the spindle should revolve. The construction is simple and efficient, and enables stalling to be quickly and easily overcome whenever it occurs without fear of breaking the drill bit or other parts of the tool or removing the latter from the hole being drilled.

For nut tightening a suitable nut driving attachment is engaged with the spindle 16. The tapered portion of the nut engaging socket will fit the taper in the spindle in the same manner as the drill bit shown in Fig. 1.

The details of construction and arrangement of parts shown and described may be variously changed and modified without departing from the spirit and scope of my invention, except as pointed out in the annexed claims.

I claim as my invention.

1. In a portable tool, a tool casing, a power operated rotary motor and a spindle journaled in said casing, a tool member connected to the spindle for rotation thereby, said motor having a driving connection with the spindle and constantly applying power thereto during the use of the tool, handle means secured to the tool casing for holding the tool while in use, and a one-way clutch device between the spindle and the tool casing, said clutch device having co-operating clutch means which connect the spindle to the tool casing on turning the tool by the handle means in the direction of rotation of the spindle by the motor whereby the handle means and the leverage afforded thereby may be employed to turn a stalled spindle when stalled by the tool member against the constantly applied power of the motor, said clutch means automatically releasing the spindle from the tool casing on the resumption of rotation of the spindle by the motor.

2. In a portable tool, a tool casing, a power operated rotary motor and a spindle journaled in said casing, a tool member connected to the spindle for rotation thereby, said motor having a driving connection with the spindle and constantly applying power thereto during the use of the tool, handle means secured to the tool casing for holding the tool while in use, a one-way clutch device having co-acting ring and revoluble clutch elements between the spindle and the tool casing, said ring-element being secured to the tool casing about the spindle and having cam-shaped recesses to accommodate the revoluble elements, the latter being wedged between the spindle and the smaller ends of the recesses to connect the spindle to the tool casing on turning the tool by the handle means in the direction of rotation of the spindle by the motor whereby the handle means and the leverage afforded thereby may be employed to turn a stalled spindle when stalled by the tool member against the constantly applied power of the motor, said revoluble elements automatically releasing the spindle from the tool casing on the resumption of rotation of the spindle by the motor, and spring means acting on the revoluble elements for yieldably holding them in release positions in the deepest portions of the recesses while the motor drives the spindle.

3. In a portable tool, a tool casing, a power operated rotary motor and a spindle journaled in said casing, said motor having a driving connection with the spindle and constantly applying power thereto during the use of the tool, a tool member directly connected to the spindle for rotation thereby, handle means secured to the tool casing for holding the tool while in use, a one-way clutch device between the spindle and said casing, said clutch device having co-acting clutch means which connect the spindle to the tool casing on turning the tool by the handle means in the direction of rotation of the spindle by the motor whereby the handle means and the leverage afforded thereby may be employed to turn a stalled spindle when stalled by the tool member against the constantly applied power of the motor, said clutch means automatically releasing the spindle from the tool casing on the resumption of rotation of the spindle by the motor, said spindle extending out of the casing at the front end of the tool and said clutch means being at the same end of the tool and having a ring-member encircling the spindle exteriorly of the casing and keyed thereto, and a cap-member applied over said ring-member and secured to the tool casing for holding the ring-member in keyed relation to the casing.

4. In a portable tool, a tool casing, a pressure fluid operated motor having a rotor with blades and a spindle, both journaled in said casing, a tool member directly connected to the spindle for rotation thereby, said rotor having a driving connection with the spindle and constantly applying power thereto during the use of the tool, handle means secured to the tool casing for holding the tool while in use, and a one-way clutch device between the spindle and the tool casing, said clutch device having co-operating clutch means which connect the spindle to the tool casing on turning the tool in a direction to engage the clutch means whereby the handle means and the leverage afforded thereby plus the dead or torque load of the motor may be employed to turn a stalled spindle when stalled by the tool member against the constantly applied power of the motor, said clutch means automatically releasing the spindle from the tool casing on the resumption of rotation of the spindle by the motor.

WILLIAM W. NASH.